(12) United States Patent
Nongpiur (10) Patent No.: US 8,296,136 B2
(45) Date of Patent: Oct. 23, 2012

(54) DYNAMIC CONTROLLER FOR IMPROVING SPEECH INTELLIGIBILITY

(75) Inventor: Rajeev Nongpiur, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 1339 days.

(21) Appl. No.: 11/940,920

(22) Filed: Nov. 15, 2007

(65) Prior Publication Data

US 2009/0132248 A1    May 21, 2009

(51) Int. Cl.
*G10L 21/02* (2006.01)
*G10L 11/06* (2006.01)

(52) U.S. Cl. .... 704/228; 704/214; 704/216; 379/406.01

(58) Field of Classification Search ................... 704/205, 704/206, 208, 225, 226, 227, 228; 379/406.01
See application file for complete search history.

(56) References Cited

U.S. PATENT DOCUMENTS

| | | | |
|---|---|---|---|
| 6,122,610 A * | 9/2000 | Isabelle | 704/226 |
| 6,862,567 B1 * | 3/2005 | Gao | 704/228 |
| 7,158,933 B2 * | 1/2007 | Balan et al. | 704/226 |
| 7,379,866 B2 * | 5/2008 | Gao | 704/220 |
| 7,443,812 B2 * | 10/2008 | Tackin et al. | 370/286 |
| 7,483,831 B2 * | 1/2009 | Rankovic | 704/225 |
| 7,720,231 B2 * | 5/2010 | Breebaart | 381/23 |
| 2003/0219130 A1 * | 11/2003 | Baumgarte et al. | 381/17 |
| 2004/0015348 A1 * | 1/2004 | McArthur et al. | 704/226 |
| 2004/0071284 A1 * | 4/2004 | Abutalebi et al. | 379/406.08 |
| 2004/0208312 A1 * | 10/2004 | Okuda | 379/406.01 |
| 2006/0018459 A1 * | 1/2006 | McCree | 379/406.06 |
| 2006/0025994 A1 * | 2/2006 | Christoph | 704/229 |
| 2006/0116874 A1 * | 6/2006 | Samuelsson et al. | 704/228 |
| 2008/0253552 A1 * | 10/2008 | Riera-Palou et al. | 379/406.01 |

* cited by examiner

*Primary Examiner* — Martin Lerner
(74) *Attorney, Agent, or Firm* — Brinks Hofer Gilson & Lione (57) ABSTRACT

A system improves the speech intelligibility and the speech quality of a speech segment. The system includes a dynamic controller that detects a background noise from an input by modeling a signal. A variable gain amplifier adjusts the variable gain of the amplifier in response to an output of dynamic controller. A shaping filter adjusts a speech signal by tilting portions of the speech signal of the dynamic controller.

7 Claims, 11 Drawing Sheets

DYNAMIC CONTROLLER FOR IMPROVING SPEECH INTELLIGIBILITY

BACKGROUND OF THE INVENTION

1. Technical Field

This disclosure relates to speech enhancement, and more particularly to enhancing speech delivered through a hands-free interface.

2. Related Art

Speech enhancement in a vehicle is a challenge. Some systems are susceptible to interference. Interface may come from many sources including engines, fans, road noise, and rain. Reverberation and echo may further interfere, especially in hands-free systems.

When used in a vehicle, a microphone may be positioned within an interior to receive sound from a driver or a passenger. When positioned away from a speaker, the desired signal strength received by the microphone decreases. As the distance increases the signal becomes more susceptible to noise and distortion.

When focusing on cost, a vehicle manufacturer may limit the number of microphones used in cars and limit the processing power of the devices that process their output. A manufacturer's desire to keep costs down may reduce the quality and intelligibility to a point that is much lower than their customers' expectations. There is room for improvement for a speech enhancement system, especially in vehicle interiors. There is a need for a system that is sensitive, accurate, has minimal latency, and enhances speech at a low computational cost.

SUMMARY

A system improves the speech intelligibility and the speech quality of a signal. The system includes a dynamic controller that detects a background noise from an input by modeling a portion of a background noise signal. A variable gain amplifier adjusts the variable gain of the amplifier in response to an output of a dynamic controller. A shaping filter adjusts the spectral shape of the speech signal by tilting portions of the speech signal in response to the dynamic controller.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Hands-free systems and phones in vehicles are susceptible to noisy environments. The spatial, linear, and non-linear properties of noise may suppress or distort speech. A speech enhancement system improves speech quality and intelligibility by dynamically controlling the gain and spectral shape of a speech signal. The speech enhancement system estimates a spectral signal-to-noise ratio (SNR) of a received speech signal. The system derives an index used to adjust spectral shapes and/or signal amplitudes. A dynamic spectral-shaping filter may adjust the spectral shape on the basis of the estimated tilt of the background noise spectrum and the derived index. Various spectral shapes may be realized by a processor or a controller that models a combination of filter responses. The system requires low computational power, improves intelligibility in real-time, and has a low processing latency.

Figure 1:
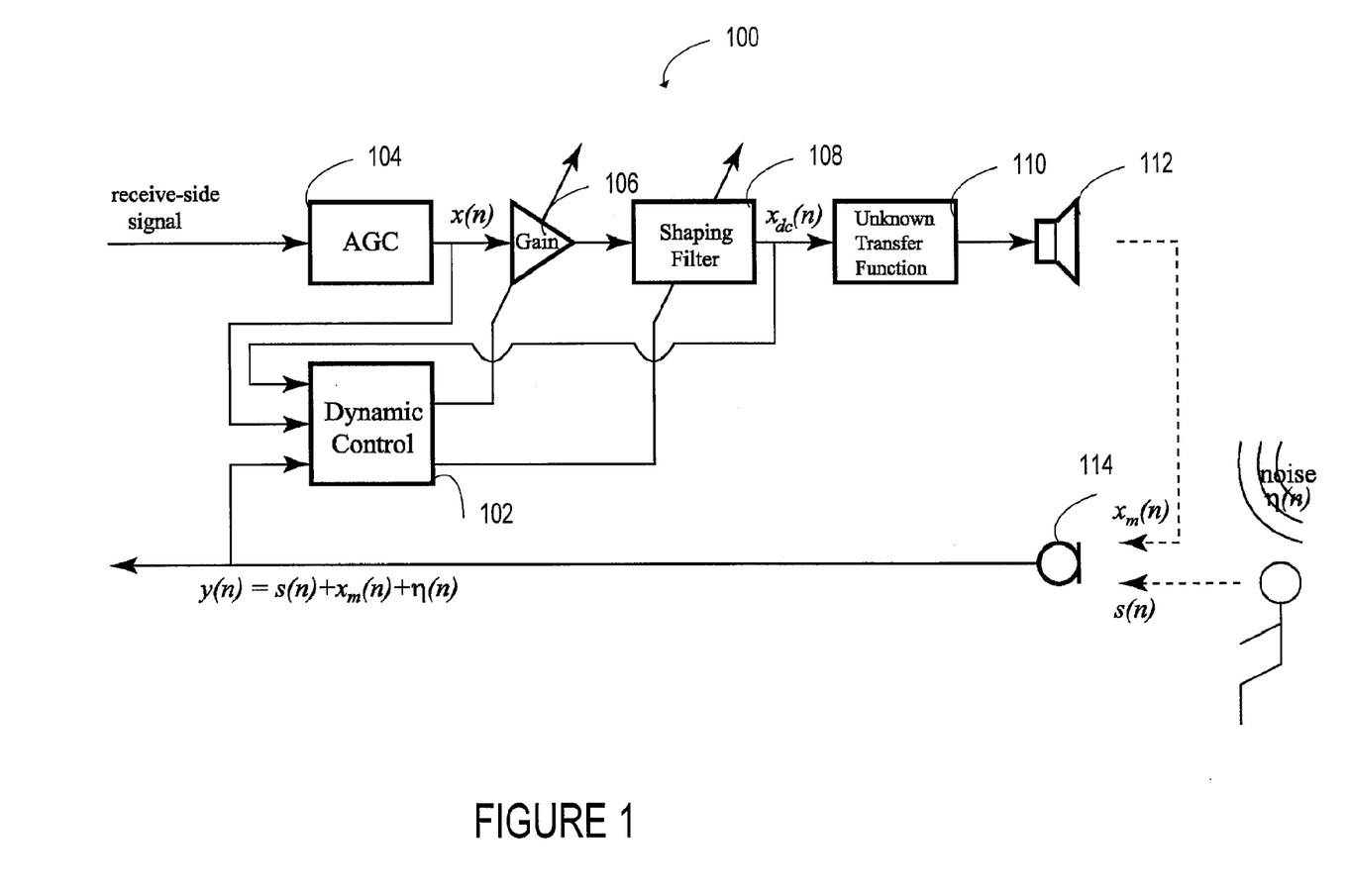
FIG. 1 is a dynamic controller in communication with a hands-free interface.

A dynamic controller 102 in communication with a hands-free system 100 is shown in FIG. 1. The dynamic controller 102 receives a receive-side signal after it is processed by an automatic gain control 104 x(n). The dynamic controller 102 also receives the receive-side signal after gain adjustment and spectral shaping, $x_{dc}(n)$, and receives a send-side signal, y(n). In FIG. 1 the receive-side signal comprises one or more signals that that pass through some or all of the processing circuits or logic that are in communication with a loudspeaker 112. The send-side signal comprises the signal or signals received at an input device 114 that may convert the send-side audio signals into analog or digital operating signals.

To compensate for varying audio levels, an automatic gain control 104 regulates the gain through an internal amplifier. By boosting or lowering the gain of the incoming receive-side signal, the automatic gain control 104 may maintain a maximum value of a speech segment at a predetermined level. The automatic gain control 104 may maintain a maximum absolute value of the receive-side signal within a desired range. The upper limit of the range may allow the signal to be further amplified without introducing distortion or clipping content.

The gain of the amplified signal may be further adjusted by a second amplifier 106. Portions of the frequency spectrum of that signal may then be enhanced or suppressed by a shaping filter 108 or dynamic filter. The signal may then pass through unknown logic or circuits 110. In some systems, the unknown logic or circuits 110 may comprise an audio amplifier that has a variable or a static transfer function.

A send-side signal y(n) is captured by the input device 114. The send-side signal y(n) may comprise a converted speech segment received from near-end speaker, s(n) and background noise ρ(n) heard or detected in an enclosure (e.g., within an interior of a vehicle, for example). When the receive-side signal is converted into sound, the send-side signal y(n) may also include a receive-side speech segment (or far-end speech), $x_m(n)$.

Figure 2:
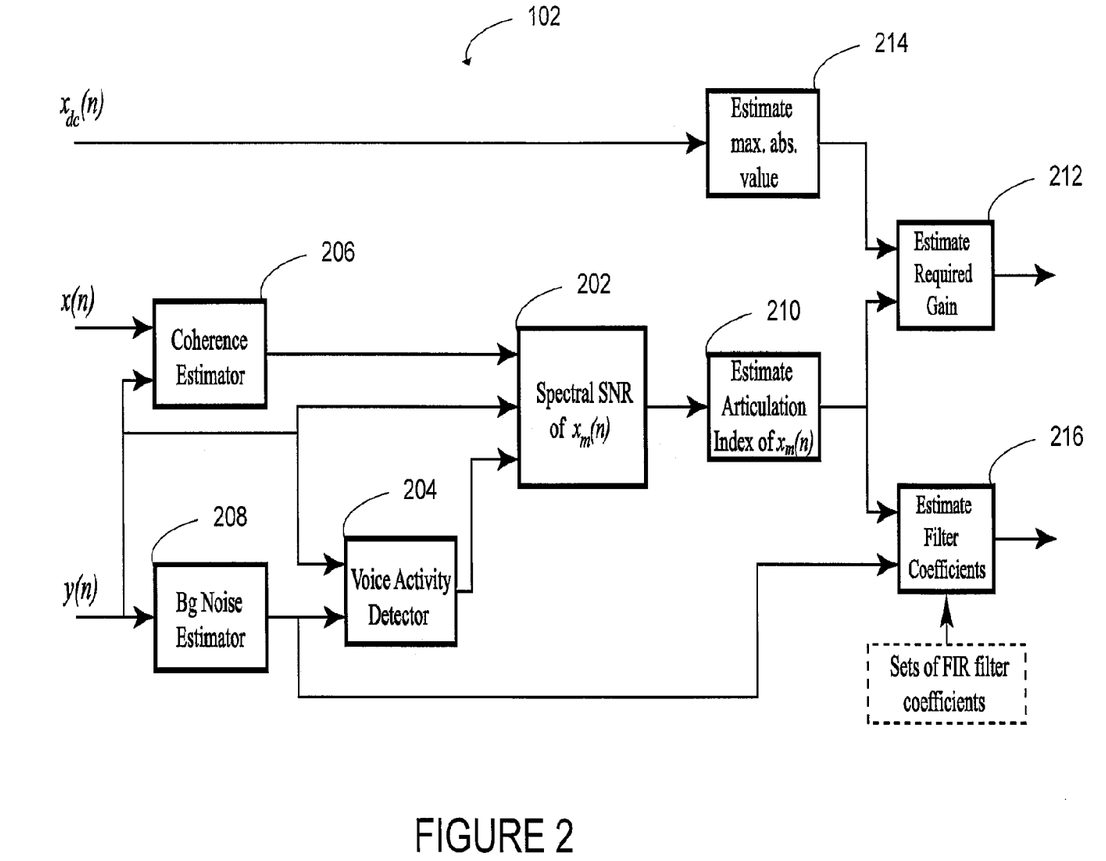
FIG. 2 is the dynamic controller of FIG. 1.

The dynamic controller 102 may estimate the gain of the second amplifier 106 and the desired filter response of the shaping filter 108 by processing multiple incoming signals. The incoming signals may include the automatic-gain-controlled receive side signal x(n), the gain-adjusted and spectrum-modified receive-side signal $x_{dc}$(n), and the send-side signal, y(n). A spectral estimator 202 shown in FIG. 2 estimates the spectral signal-to-noise ratio (SNR) of a far-end signal segment $x_m$(n) by processing an output of a voice activity detector 204, a coherence estimator 206, and the send-side signal, y(n). The voice activity detector 204 determines if a segment of the send-side signal, y(n), represents voiced, unvoiced, or a silent segment. Voice sounds may be periodic in nature and may contain more energy than unvoiced sounds. Unvoiced sounds may be more noise-like and may have more energy than silence. Silence may have the lowest energy and may represent the energy detected in the background noise. In FIG. 2, the background noise may be identified by a separate background noise estimator circuit or logic 208.

The spectral energy of $x_m$(n) may be determined by isolating the speech portions in y(n) that corresponds to the far-end signal segment $x_m$(n). The voice activity detector 204 may identify speech endpoints that identify speech portions in the send-side signal y(n). A coherence estimator 206 may estimate the spectral coherence between the amplified receive side signal x(n) and the send-side signal, y(n). The spectral coherence may be a parameter that quantifies the quality of interference between the amplified receive-side signal x(n) and the send-side signal, y(n). The degree of coherence may measure how perfectly the receive side signal x(n) and the send-side signal, y(n) may cancel depending on the relative phase between them. A high coherence value may indicate the presence of the modified received side signal $x_m$(n).

To compensate for the variability in coherence that occurs when the background noise changes, the coherence estimator 206 may normalize the coherence values with respect to the background noise spectrum in some systems. To ensure more reliability, the maximum and minimum delay lags between the amplified receive side signal x(n) and the far-end signal segment $x_m$(n) for a particular enclosure or vehicle may be determined and the coherence value estimated within delay lags. Delay-lag values may be determined from an echo canceller or a residual-echo suppressor when used.

Using the signal-to-noise ratio (SNR) of the far-end signal segment $x_m$(n), an articulation estimator 210 may measure the intelligibility of the modified received side signal $x_m$(n). The signal may be divided into frequency bands, which are given weights based on predetermined contributions to intelligibility. The articulation index may comprise a linear measure that ranges between about 0 and about 1 (where 1 corresponds to the upper limit of intelligibility). An exemplary application may break up the spectral signal-to-noise ratio (SNR) of a far-end signal segment $x_m$(n) into five octave bands that may have center frequencies occurring at about 0.25, about 0.5, about 1, about 2, and about 4 kHz.

If $\sigma_{xm}$(i) [dB] is an A-weighted average signal-to-noise ratio (SNR) of the far-end signal segment $x_m$(n) in octave band i, the articulation index (AI) of the far-end signal segment $x_m$(n) may given by equation 1.

$$AI(x_m) = \frac{1}{30}\sum_{i=1}^{5} w_i \hat{\sigma}_{x_m}(i)[dB] \quad (1)$$

where $\hat{\sigma}_{xm}$(i)[dB] is the clipped A-weighted signal-to-noise ratio (SNR) given by equation 2, $$\hat{\sigma}_{x_m}(i)[dB] = \begin{cases} 18 & \text{if } \sigma_{x_m}(i)[dB] \geq 18 \\ -12 & \text{if } \sigma_{x_m}(i)[dB] \leq -12 \\ \sigma_{x_m}(i) & \text{otherwise} \end{cases} \quad (2)$$

and $w_i$ is the weight given to octave band i, according to exemplary Table 1.

TABLE I

WEIGHING FACTORS FOR EACH OCTAVE BAND

| Octave Bands (i) | Centre Frequency (Hz) | Weighing Factor ($w_i$) |
|---|---|---|
| 1 | 250 | 0.072 |
| 2 | 500 | 0.144 |
| 3 | 1000 | 0.222 |
| 4 | 2000 | 0.327 |
| 5 | 4000 | 0.234 |

To estimate the gain factor for the far-end signal segment $x_m$(n), multiple inputs may be processed by gain estimator 212. The articulation index (AI) of the far-end signal segment $x_m$(n) and the estimated maximum value of the amplified and adaptively filtered receive-side signal $x_{dc}$(n) are processed. An estimator 214 may estimate a maximum value of the amplified and adaptively filtered receive-side signal $x_{dc}$(n) designated $\lambda_{xdc}$, by equation 3.

$$\lambda_{x_{dc}} = \max_i |Speech_{x_{dc}}(i)| \quad (3)$$

where $Speech_{xdc}$(i) is the i element of a vector that holds the last M samples of detected speech portions in $x_{dc}$(n). The parameter $\lambda_{xdc}$ may be constantly adjusted in real-time or after a delay (that may depend on the application) so that it lies between certain maximum and minimum values. For example, if $\lambda_{xdc}$ falls below a certain minimum threshold, yin, such as between about 0 and about 0.3 the gain of the amplifier 106 may be gradually increased. If $\lambda_{xdc}$ rises above a certain maximum threshold, $\gamma_{max}$, such as about 0.7, the gain of amplifier 106 may be reduced.

When $\lambda_{xdc}$ lies between $\gamma_{min}$ and $\gamma_{max}$, the gain estimator may process the output of the articulation estimator 210. When articulation index (AI) is greater than a certain maximum threshold, $t_{max}$, the intelligibility may be assumed to be very good and the gain factor of amplifier 106 may be reduced by $\delta_{fall}$ dB. When the articulation index (AI) is less than a predetermined minimum threshold $t_{min}$, the intelligibility may be low and the gain factor of amplifier 106 may be increased by $\delta_{rise}$ dB. When the articulation index (AI) lies between about $t_{min}$ and about $t_{max}$, the gain factor of amplifier 106 may not change. The gain factor, G, may be expressed by equation 4.

$$G[dB] = G[dB] + \begin{cases} \beta_{rise} & \text{if } \lambda_{x_{dc}} \leq \Gamma_{min} \\ -\beta_{fall} & \text{if } \lambda_{x_{dc}} \geq \Gamma_{max} \\ \gamma & \text{otherwise} \end{cases} \quad (4)$$

where $$\gamma = \begin{cases} \delta_{rise} & \text{if } AI(x_m(n)) \leq t_{min} \\ -\delta_{fall} & \text{if } AI(x_m(n)) \geq t_{max} \\ 0 & \text{otherwise} \end{cases} \quad (5)$$

$0 < t_{min} < t_{max} < \sim .7$, and $\Gamma_{min} < \Gamma_{max}$.

When the shaping filter 108 comprises a Finite Impulse Response (FIR) filter, the filter coefficients may be estimated on the basis of the articulation index (AI) of the far-end signal segment $x_m(n)$ and the background noise spectrum of $\rho(n)$. In some applications, the filter coefficients are selected so that they maximize the intelligibility of speech without increasing the overall energy of the signal. If the intelligibility is sufficiently high, the coefficients may be programmed to improve speech quality.

To select the filter coefficients, the articulation index (AI) of the far-end signal segment $x_m(n)$ may be processed by the filter coefficient estimator 216 to determine if it is high or close to 1. If the speech intelligibility is sufficiently high, the dynamic controller 102 may adjust the filter coefficients of the shaping filter 108 so that the tilt of the response approximates an estimated tilt of the background noise spectrum. An alternative system may normalize the speech spectrum so that the average long-term speech spectrum matches the standard speech-spectrum.

When the articulation index (AI) of the far-end signal segment $x_m(n)$ is small or close to about 0, the dynamic controller 102 may improve speech intelligibility through constrained optimization logic and the optimization hardware programmed to optimize equation 6.

$$\max_h \; AI(x_m(n) * h(n)) \quad (6)$$

$$\text{subject to: } E[|x_m(n) * h(n)|^2] = E[|x_m(n)|^2]$$

where * denotes convolution, $h(n)$ is the impulse response of the shaping filter, and $h$ is a vector of the impulse response and given by matrix 7.

$$h = \begin{bmatrix} h(0) \\ h(1) \\ \vdots \\ h(N) \end{bmatrix} \quad (7)$$

where N is the length of the shaping filter.

In an alternative speech enhancement system 100, the articulation index (AI) of the far-end signal segment $x_m(n)$ may be used to determine the filter coefficients of the shaping filter 108. When the articulation index has a low value (AI) (e.g., close to about 0), the filter coefficients of the shaping filter 108 may be programmed to enhance the speech intelligibility of the receive-side signal. As the articulation index (AI) increases or begins to get closer to about 1, the amplitude response may begin to improve speech quality. To process the various spectral shapes, an adaptive Finite Impulse Response (FIR) shaping filter such as the filter disclosed in U.S. patent application Ser. No. 11/809,952, now U.S. Pat. No. 7,912,729, issued 22 Mar. 2011, entitled "High-Frequency Bandwidth Extension in the Time Domain" filed on Jun. 4, 2007, which is incorporated by reference, may be used. The output response of the shaping filter 108 may be described by equation 8

$$h(k)=\beta_1(k)h_1+\beta_2(k)h_2+\ldots+\beta_L(k)h_L \quad (8)$$

where $h_1, h_2, \ldots, h_L$ are the L basis filter-coefficient vectors, $h(k)$ is the updated filter coefficient vector, and, $\beta_1(k), \beta_2(k), \ldots, \beta_L(k)$ are the L scalar coefficients that are updated every N samples as expressed in equation 9.

$$\beta_i(k)=f_i(AI(x_m(n)),\eta(n)) \quad (9)$$

Figure 3:
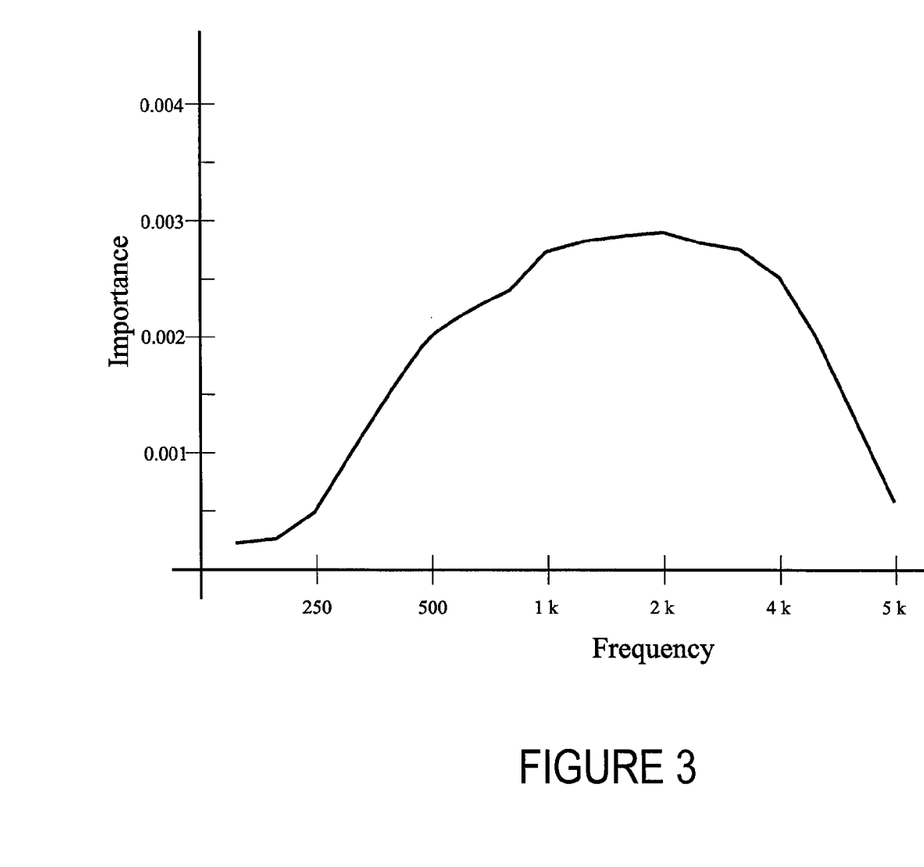
FIG. 3 is an exemplary filter response.

The basis filter coefficients may be pre-programmed so that they may be linearly combined to approximately model most of the noise spectrums and an inverse noise-spectrum that may be encountered in an enclosure such as in the interior of a vehicle. The noises encountered in a vehicle environment may have spectrums with a greater low-frequency energy that gradually tapers down as the frequency increases. A basis coefficient vector with an amplitude response that maximizes the intelligibility of speech in a high white-noise environment that may be detected in a vehicle may be programmed so that the vector has an amplitude-response shape that may be similar to the response shown in FIG. 3.

Figure 4:
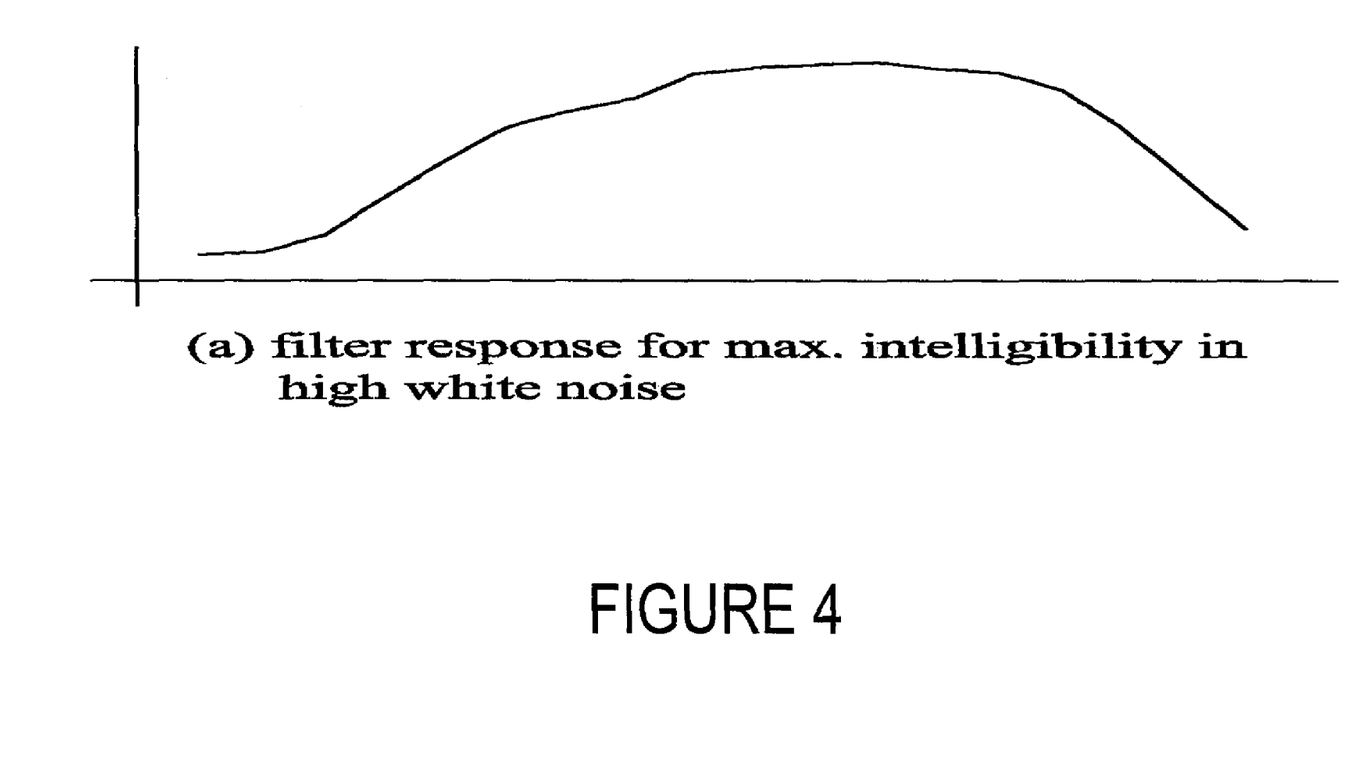
FIG. 4 is an exemplary filter response that may maximize speech intelligibility.
Figure 5:
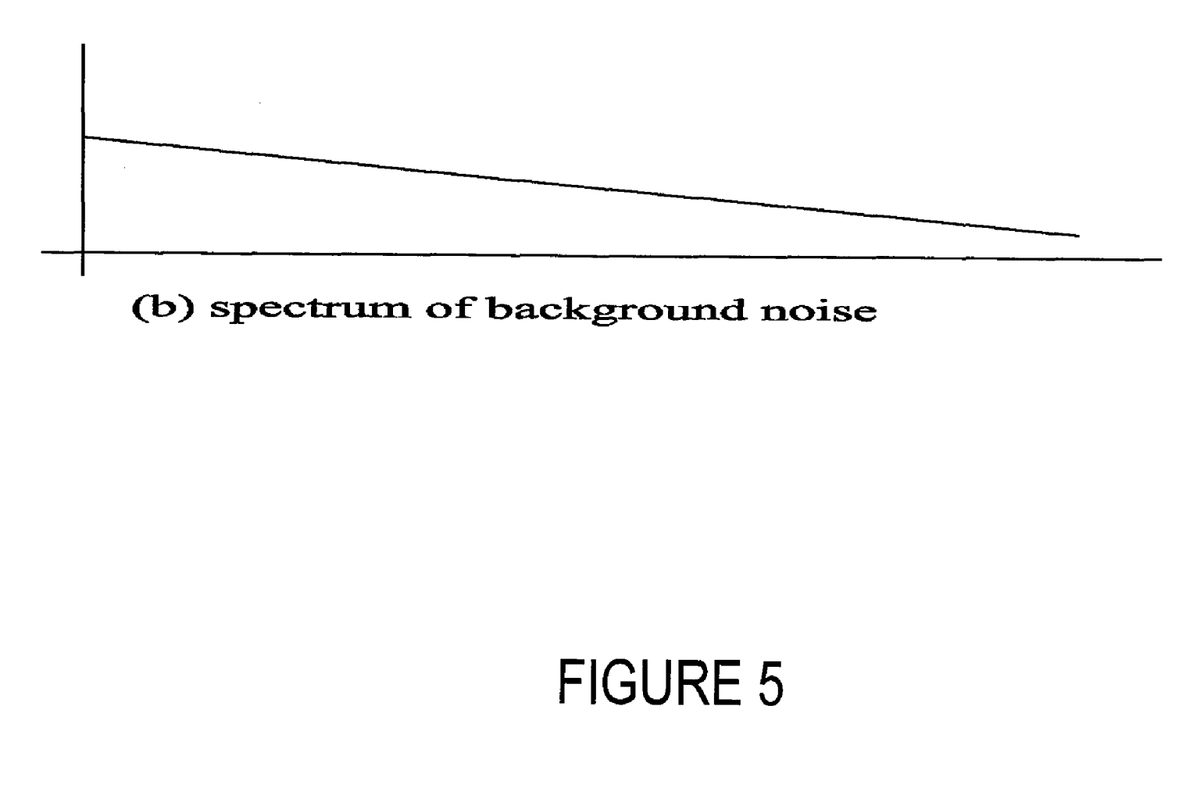
FIG. 5 is an exemplary shape of a linear approximation of a background noise.
Figure 6:
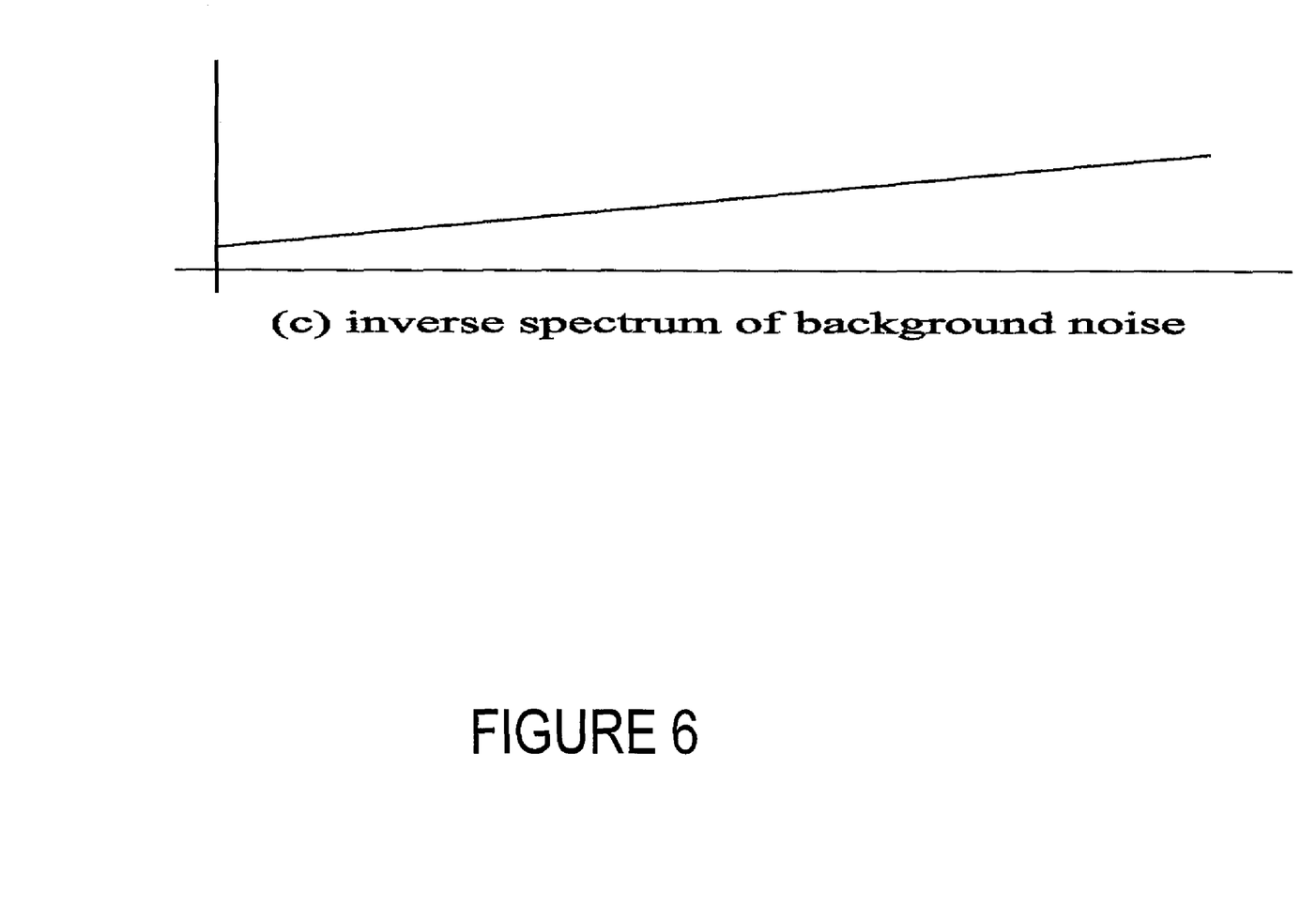
FIG. 6 is an exemplary shape of the inverse spectrum of FIG. 5.
Figure 7:
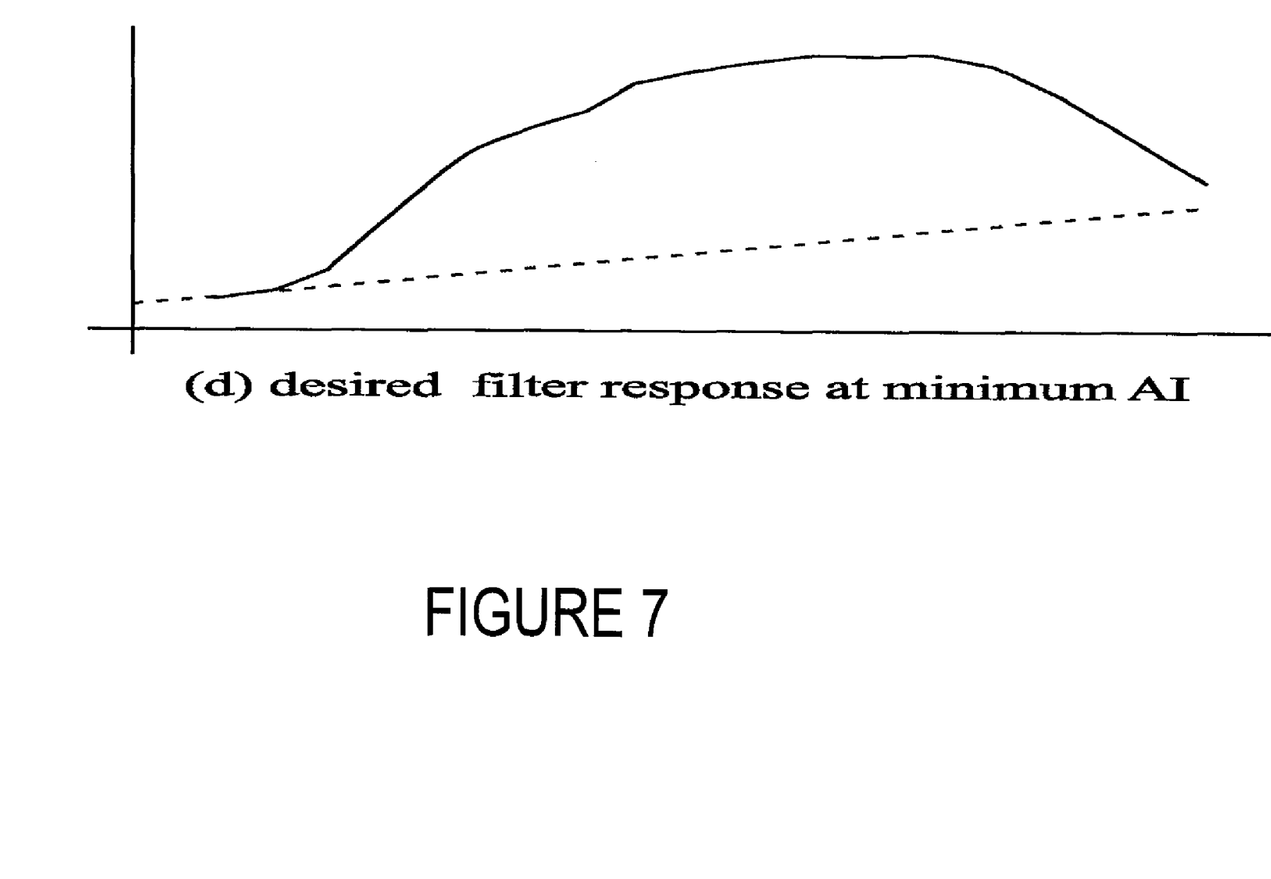
FIG. 7 is an exemplary desired filter response.

While the system may improve speech intelligibility in a high noise condition and speech quality in a low noise condition, FIG. 4 illustrates an exemplary simulated shaping filter 108 response in a high noise condition. To attain a high intelligibility of the receive side signal in the noise condition shown in exemplary FIG. 5, the amplitude response of the shaping filter 108 is programmed to generate the exemplary response shown in FIG. 4. The slope of the inverse background spectrum represented by exemplary FIG. 6 is derived by approximating a linear relationship to the background noise shown in exemplary FIG. 5. The shaping filter 108 response is adjusted by tilting the response by approximating an inverse linear relationship to the background spectrum as shown in exemplary FIG. 7.

Figure 8:
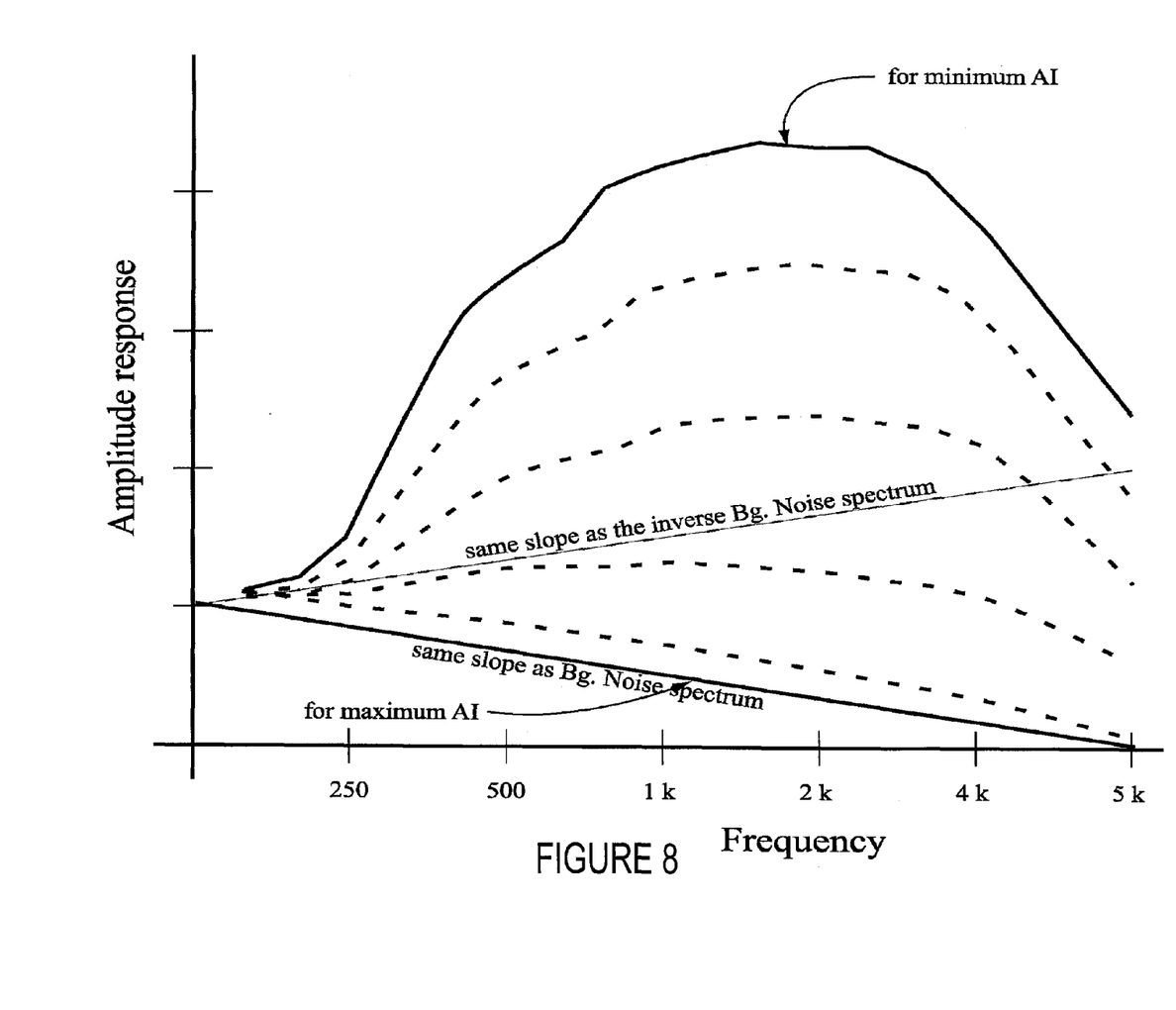
FIG. 8 are exemplary dynamic responses of a shaping filter.

When the estimated articulation index (AI) of the far-end signal is high or approaching 1, the speech intelligibility is assumed to be high and the filter coefficients are programmed to improve the quality of the receive side signal $x_m(n)$. Under these conditions, the amplitude response of the shaping filter shown by example in FIG. 4 is adjusted by tilting the filter response by the approximated slope of the background spectrum as shown in exemplary FIG. 8. FIG. 8, shown only for illustrative purposes, illustrates how the amplitude response of the shaping filter 108 may change as the articulation index (AI) of the receive side signal $x_m(n)$ may change within a range between about 0 and about 1. A more accurate mapping between the articulation index (AI) and the filter shape may vary with shape or contour of an enclosure such as a vehicle interior and may comprise a non-linear or other approximation or function.

The speech enhancement system improves speech intelligibility and/or speech quality near the position of a listener's ears. The filter coefficient adjustments and gain adjustments may be made in real-time based on signals received from an input device such as a vehicle microphone or loudspeaker. Since the distance between the listener's ears and the microphone may vary, the signal-to-noise ratio of the receive-side signal at two positions may not coincide or may not be exactly the same. This may occur when prominent vehicle noises are detected that do not have a highly diffused field. These noises may be generated by a fan or a defroster. To compensate for these conditions, the speech enhancement system may communicate with other noise detectors that detect and compensate for these conditions. The system may apply additional compensation factors to the receive-side signal $x_m(n)$ through a spectral signal-to-noise estimator such the gain estimator 212. The gain estimator 212 may communicate with a system that suppresses wind noise from a voiced or unvoiced signal such as the system described in U.S. patent application Ser. No. 10/688,802, now U.S. Pat. No. 7,895,036, issued 22 Feb. 2011, entitled "System for Suppressing Wind Noise" filed on Oct. 16, 2003, which is incorporated by reference.

Figure 9:
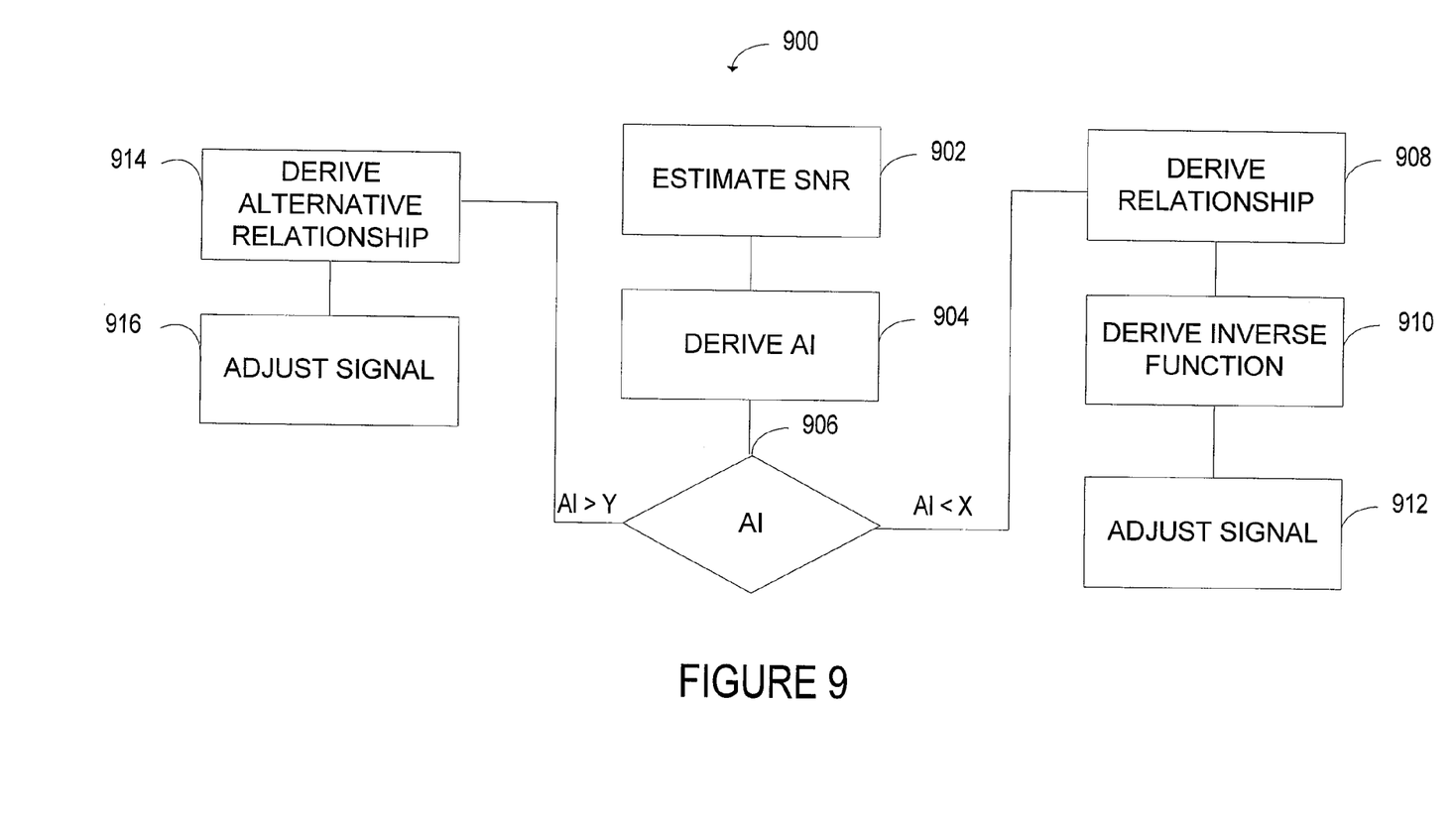
FIG. 9 is an exemplary method that improves speech intelligibility and speech quality.

FIG. 9 is an exemplary real-time or delayed method 900 that improves speech intelligibility and/or speech quality. At 902 a spectral signal-to-noise ratio (SNR) of a receive-side signal is estimated. Based on the spectral signal-to-noise ratio (SNR) of the receive-side signal, an articulation index (AI) is derived at 904. If the articulation index (AI) is below a certain pre-determined threshold such as about 0.3, (906) for example, the gain and/or the spectral shape of portions of the receive-side signal are adjusted so that intelligibility of the receive-side signal is increased 912. In one method, the amplitude of portions of the receive-side signal is adjusted by tilting portions of the amplitude of the receive-side signal to an estimated inverse relationship (908) or inverse slope. The adjustment may fit a line to a background noise spectrum and derive an estimated inverse function (910) or inverse slope of the background noise. When the articulation index (AI) is above a predetermined threshold such as about 0.7, (906) the intelligibility of the signal and the gain and the spectrum of the receive-side signal may be adjusted at 916 based on an alternative relationship 914. In one method, portions of the receive-side signal are adjusted by tilting portions of the amplitude of the receive-side signal to an estimated linear or non-linear relationship. A linear relationship may be derived by estimating the slope of a background noise. The methods described have a low computational requirement. The method (and systems described in the system descriptions) may operate in the time-domain and may have low propagation latencies.

Figure 10:
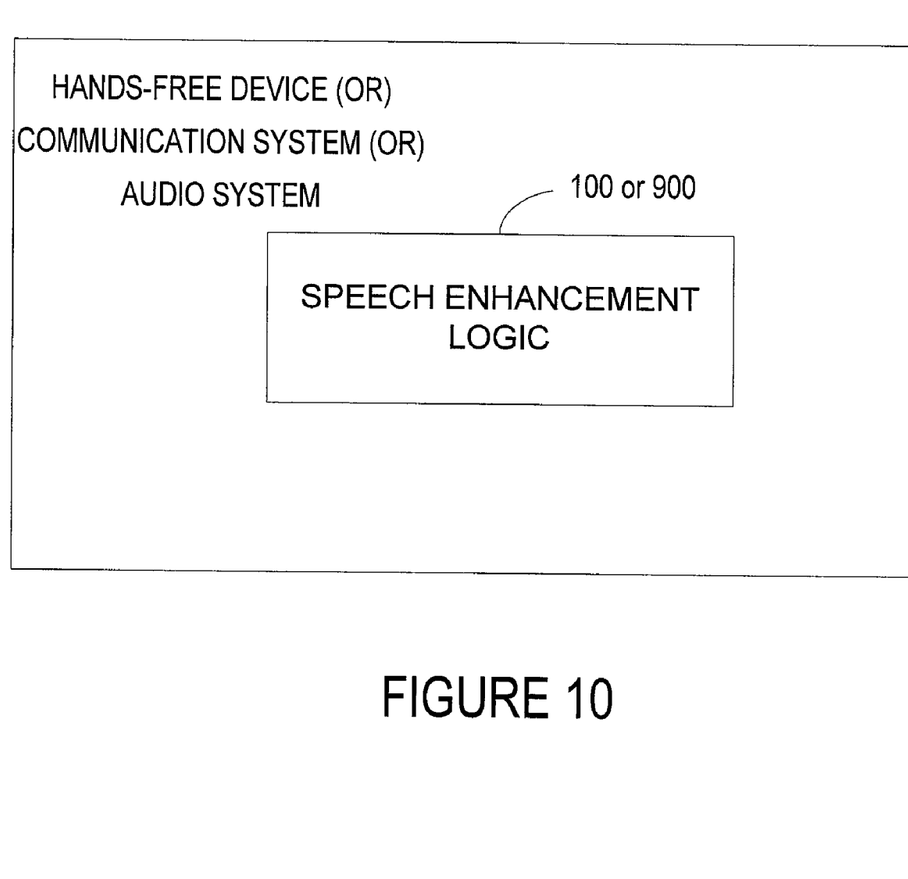
FIG. 10 is a hands-free-device or communication system or audio system in communication with a speech enhancement logic.
Figure 11:
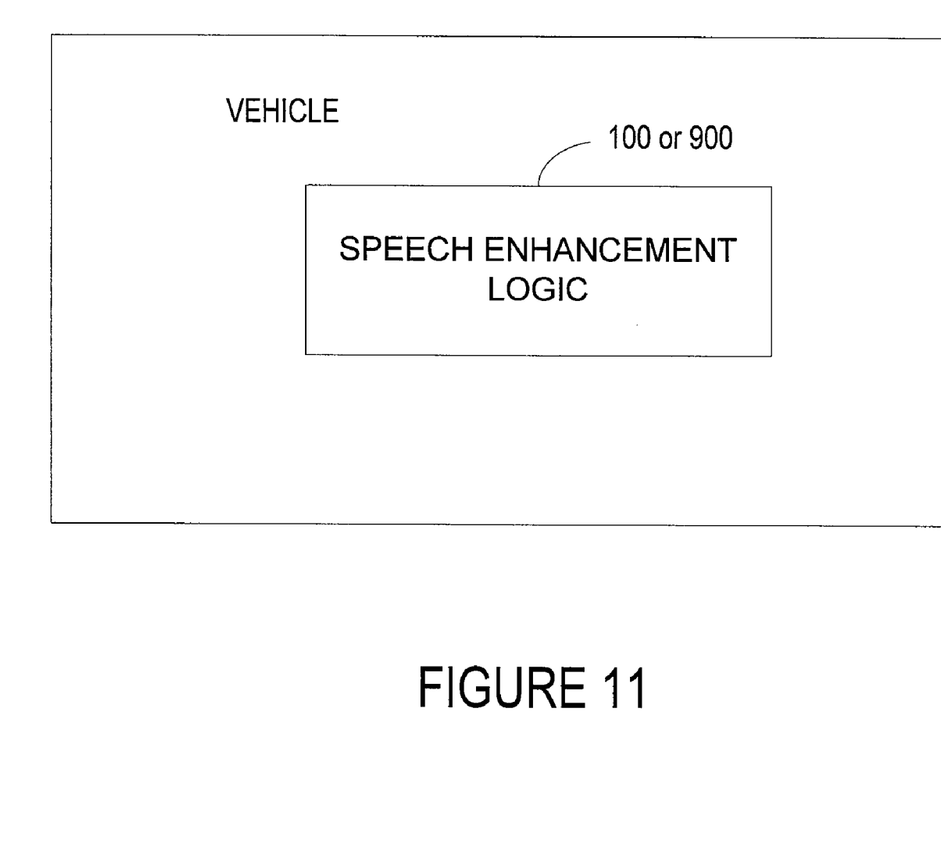
FIG. 11 is vehicle having a dynamic controller in communication with a speech enhancement logic.

The method of FIG. 9 may be encoded in a signal bearing medium, a computer readable medium such as a memory that may comprise logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or comfort controller of a vehicle or any other type of non-volatile or volatile memory interfaced or resident to a speech enhancement system. The memory may include an ordered listing of executable instructions for implementing logical functions. A logical function may be implemented through digital circuitry, through source code, through analog circuitry, or through an analog source such through an analog electrical, or audio signals. The software may be embodied in any computer-readable medium or signal-bearing medium, for use by, or in connection with an instruction executable system, apparatus, device, resident to a hands-free system or communication system or audio system shown in FIG. 10 and also may be within a vehicle as shown in FIG. 11. Such a system may include a computer-based system, a processor-containing system, or another system that includes an input and output interface that may communicate with an automotive or wireless communication bus through any hardwired or wireless automotive communication protocol or other hardwired or wireless communication protocols.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The system may dynamically control the gain and spectral shape of the receive-side signal in an enclosure or an automobile communication device such as a hands-free system. In an alternative system, the spectral signal-to-noise ratio (SNR) of the receive signal may be estimated by a signal-to-noise ratio processor and the articulation index (AI) derived or approximated by an articulation index (AI) processor. Based on the output of the articulation index processor and an estimated linear or non-linear relationship of the background modeled by the background noise processor, the gain and filter response for a shaping filter may be rendered by a shaping processor or a programmable filter and amplifier. In a high noise or low noise conditions, the spectrum of the signal may be adjusted to the method described in FIG. 9 so that intelligibility and signal quality is improved. In an alternative system, the adjustment of the spectral shape of a speech segment may be processed through a spectral-shaping technique. A Finite Impulse Response Filter (FIR) that may operate in the time domain and does not require high order (e.g., an order of around about 10 may be sufficient) may be used. The filter may have a low latency and low computational complexity. When the processors are a unitary (e.g., single) or integrated devices, the system may require very little board space.

The speech enhancement system improves speech quality and intelligibility by dynamically controlling the gain and spectral shape of a speech signal. The speech enhancement system (also referred to as speech enhancement logic) estimates a spectral signal-to-noise ratio (SNR) of a received speech signal. The system derives an index used to adjust spectral shapes and/or signal amplitudes. The estimated tilt of the background noise spectrum and a dynamic spectral-shaping filter may adjust the spectral shape. Various spectral shapes may be realized. In high noise conditions, the spectrum of the receive-side signal may be adjusted so that intelligibility is improved. In low noise conditions, the spectrum of the receive-side signal may be adjusted so that the quality of the signal is improved. The gain of the receive-side is allowed to vary within a certain range and may adjust the signal level on the basis of the intelligibility of a speech segment.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system that improves the speech intelligibility and the speech quality of a speech signal comprising:
a dynamic controller that is adapted to detect a background noise from an input comprising multiple signals by modeling, where the dynamic controller comprises:

a voice activity detector configured to identify which of the multiple signals comprises a speech signal, an unvoiced signal, or the background noise; and a coherence estimator configured to estimate the spectral coherence between the unvoiced signal or the background noise and the speech signal by quantifying a quality of interference between the unvoiced signal or the background noise with the speech signal;

a variable gain amplifier adapted to adjust the variable gain in response to an output of dynamic controller; and a shaping filter that adjusts the speech signal by tilting portions of the speech signal in response to the signal modeling of the dynamic controller.

2. The system that improves speech intelligibility and the speech quality of a speech signal of claim 1 where the modeling comprises approximating a linear relationship.

3. The system that improves speech intelligibility and the speech quality of a speech signal of claim 2 where the modeling comprises approximating an inverse linear relationship.

4. The system that improves speech intelligibility and the speech quality of a speech signal of claim 1 where the modeling comprises approximating an inverse linear relationship.

5. The system that improves speech intelligibility and the speech quality of a speech signal of claim 1 where the process comprises approximating a non-linear relationship.

6. The system that improves speech intelligibility and the speech quality of a speech signal of claim 1 where the dynamic controller further comprises:

a spectral estimator configured to estimate the signal-to-noise ratio of at least one of the multiple signals; and an articulation estimator configured to measure the intelligibility of an output of the spectral estimator.

7. The system that improves speech intelligibility and the speech quality of a speech signal of claim 6 where the articulation estimator generates an articulation index that measures the intelligibility of the output from the spectral estimator, where the shaping filter adjusts the speech signal based on a comparison of the articulation index to a plurality of predetermined thresholds.

* * * * *